Figure 1:
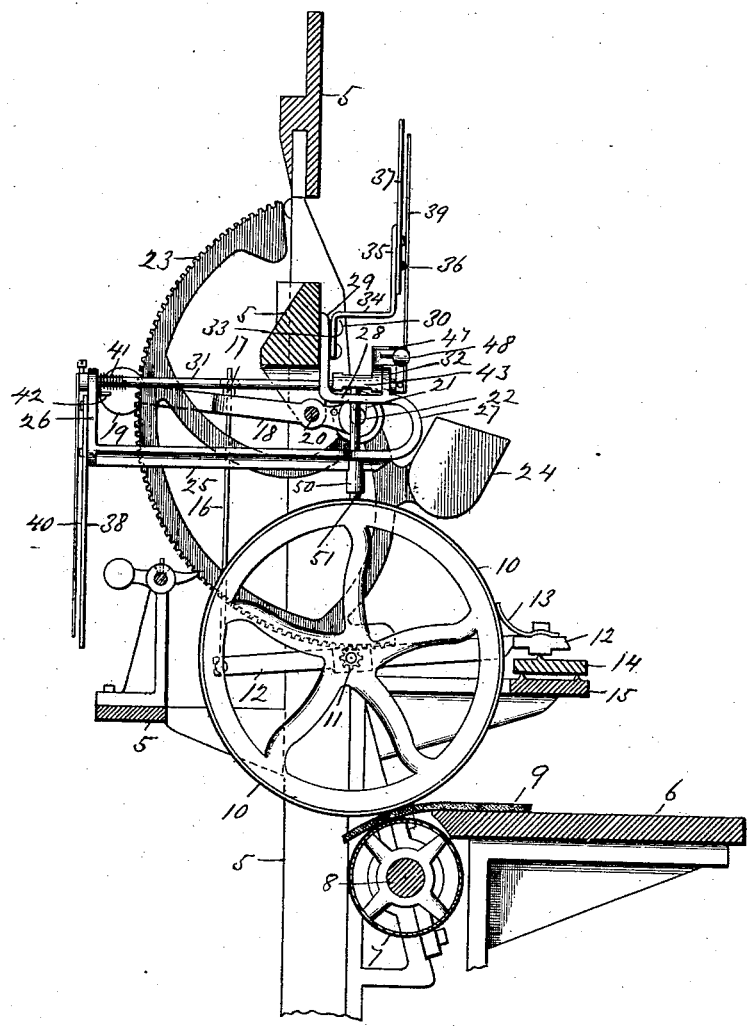

No. 883,832.  
PATENTED APR. 7, 1908.  
J. ROBERTSON & J. S. DELANEY.  
THICKNESS MEASURING ATTACHMENT FOR MACHINES FOR MEASURING THE AREAS OF SURFACES.  
APPLICATION FILED JUNE 22, 1907.

2 SHEETS—SHEET 1.

WITNESSES:  
M. A. Atwood  
Frank G. Parker

INVENTORS:  
James Robertson  
John S. Delaney  
By their Atty.  
Henry W. Williams No. 883,832. PATENTED APR. 7, 1908.
J. ROBERTSON & J. S. DELANEY.
THICKNESS MEASURING ATTACHMENT FOR MACHINES FOR MEASURING
THE AREAS OF SURFACES.
APPLICATION FILED JUNE 22, 1907.
2 SHEETS—SHEET 2.
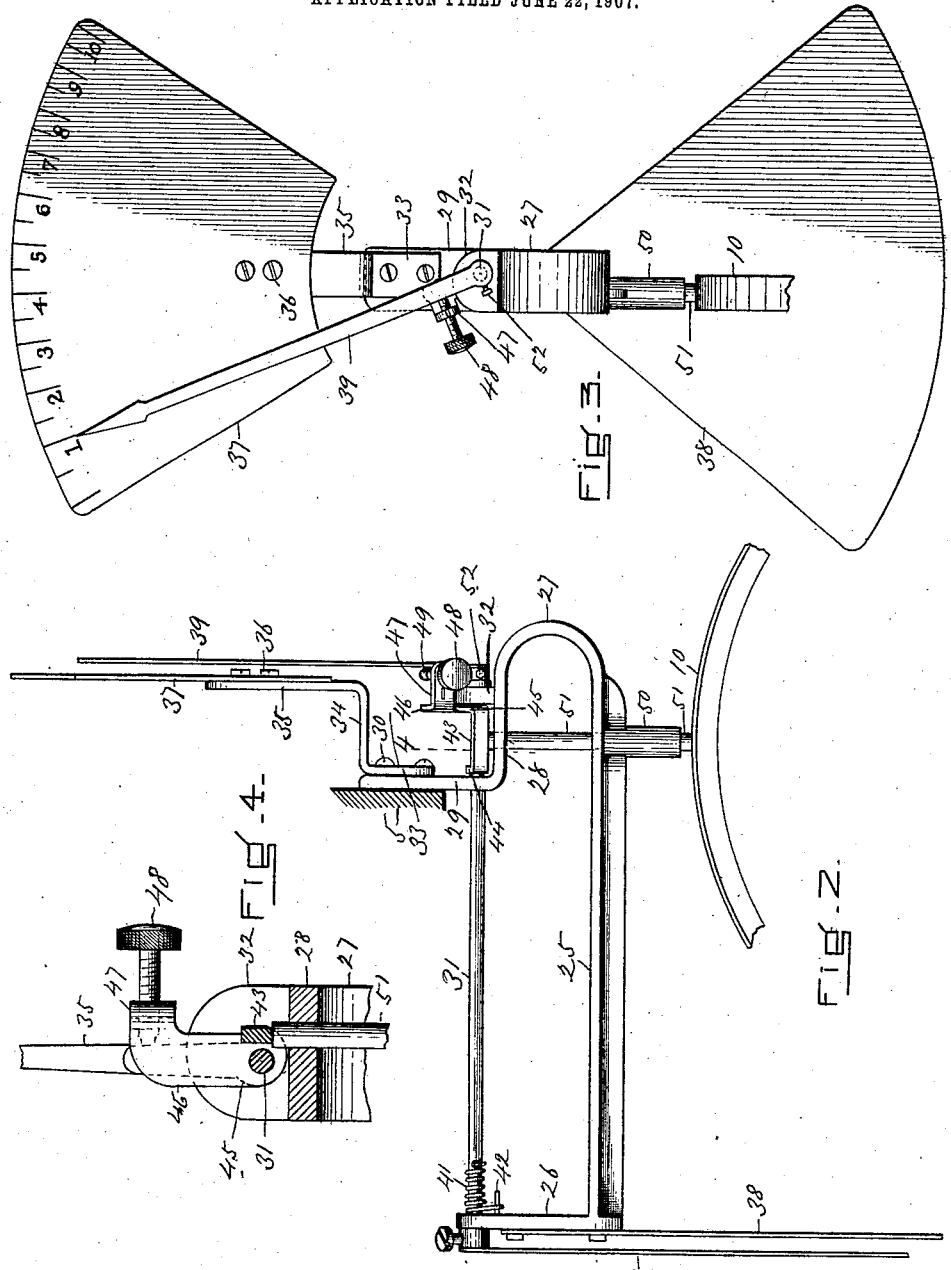

UNITED STATES PATENT OFFICE.

JAMES ROBERTSON, OF WOBURN, AND JOHN S. DELANEY, OF SOMERVILLE, MASSACHUSETTS, ASSIGNORS OF ONE-THIRD TO ALBERT W. BLISS, OF BROOKLINE, MASSACHUSETTS.

THICKNESS-MEASURING ATTACHMENT FOR MACHINES FOR MEASURING THE AREAS OF SURFACES.

No. 883,832.	Specification of Letters Patent.	Patented April 7, 1908.

Application filed June 22, 1907. Serial No. 380,273.

*To all whom it may concern:*

Be it known that we, JAMES ROBERTSON, a citizen of the United States, residing in Woburn, in the county of Middlesex and State of Massachusetts, and JOHN S. DELANEY, a citizen of the United States, residing in Somerville, in said county and State, have invented new and useful Improvements in Thickness-Measuring Attachments for Machines for Measuring the Areas of Surfaces, of which the following is a specification.

This attachment is intended to be applied to machines for measuring the areas of surfaces, of the style or type to which the invention illustrated in United States Letters Patent dated October 2, 1883 and numbered 286,078 belongs. The said Letters Patent refers to an invention for measuring the areas of surfaces, and our present invention relates to an attachment for measuring the thicknesses of sheets, such as hides and skins, and the attachment is so constructed that it can be applied to the frame of the said machine, and to others of the same general type, whereby as the machine for measuring the areas of surfaces is operated on a hide or skin the attachment measures also the thickness of the hide or skin or other sheet as it passes through said machine.

The invention consists in the novel construction and arrangement of parts fully described below, and illustrated in the accompanying drawings, in which:—

Figure 1 is a cross vertical section taken through a portion of a machine for measuring the areas of surfaces, with our invention shown in elevation attached thereto—a sufficient portion of the machine to illustrate the operation of our attachment being shown. Fig. 2 is an enlarged side elevation of our attachment—a portion being illustrated in section of the frame of the machine to which it is applied, and a small part of one of the wheels of said machine being shown in elevation. Fig. 3 is a front view of our attachment removed from the machine. Fig. 4 is a section taken on line 4—4, Fig. 2, with the pointer or indicator in a vertical position. In the other figures the indicator is represented as pointing to a low figure on the dial.

Similar characters of reference indicate corresponding parts.

Reference numerals 5 represent different portions of the frame of a machine for measuring areas, of the type above referred to.

6 is a bed or table in said machine.

7 is a horizontal roller on a shaft 8 driven by any suitable power in the proper direction to feed a sheet, such as a piece of leather, 9 into the machine and under a series of friction-wheels 10 which rest on said roller (or on the sheet 9), said wheels being supported by shafts 11, which have their bearings in arms 12. One end of each of these arms is provided with a spring-brake 13 which bears on the periphery of the wheel 10, and said end rests on a plate 14 which is supported by a suitable bracket 15. The other end of the arm 12 is pivotally connected to a hanger 16 whose upper end is provided with a thumb-nut 17 which rests on the lever 18 weighted at its outer end at 19 and pivotally supported at 20 by the frame. The short arm of this lever is provided with a slot 21 whereby said arm is held down by a shaft 22 supported by the frame and having rigid on it the toothed segment 23. In this mechanism, when a sheet is conducted between the roll 7 and the wheels 10, the wheels are rotated, imparting rotation to the segments 23 by means of the pinions 11, and by suitable mechanism measuring the area of the surface of the sheet 9, all as described in the Letters Patent above referred to. The segment 23 is provided with a suitable weight or counterbalance 24, the weighted end 19 of the lever 18 serves to keep the slotted end of said lever up against the shaft 22, and the arm 12 allows each wheel 10 to be lifted by the thickness of the sheet of material inserted between it and the roller 8. None of the above described parts are claimed as new, and all make a part of the area-measuring machine referred to—one of the wheels 10 being the part which by its vertical lifting movement directly actuates our invention.

The frame of our thickness-measuring attachment comprises a longitudinal horizontal bar 25 provided at one end with the upwardly extending standard or support 26. At the opposite end this bar is bent upward at 27 and back upon itself into the parallel horizontal portion 28, from which the extreme end extends upward into the vertical portion 29 which is secured at 30 to the frame 5 of the area-measuring machine.

31 represents a horizontal rod or shaft which extends through and has its bearings in the standard 26 and the portion 29, and from said portion 29 the rod extends through the short vertical bracket 32 making a part of the frame of our attachment. Secured at 30 to the portion 29 of the frame is a bracket comprising the vertical portion 33, the horizontal portion 34 and the vertical portion 35, and to this last named portion there is secured at 36 a plate 37, preferably of sheet metal and sector-shaped; said plate being provided on its outer surface next its curved edge with a suitable scale. The standard 26 has secured to its outer surface a downwardly extending sector-shaped plate 38 of the same size and shape as the plate 37, provided with a similar scale. Thus there are two plates or dials at different heights and facing in opposite directions which can be observed by persons of different heights, or standing on opposite sides of the machine.

Rigid on the opposite ends on the shaft 31 are pointers 39 and 40, extending over the outer faces of the dials 37 and 38 respectively, and held normally toward the left by the spring 41 which encircles the shaft and has one end secured thereto and its other end in engagement with a pin 42 extending from the standard 26. Swinging on the shaft 31 between the vertical portion 29 of the frame and the bracket 32, is a frame consisting of the main portion 43 and the ears 44 and 45 through which said shaft extends, the ear 45 being provided with an extension 46 which is bent at right angles at 47 to receive an adjusting screw 48 which bears against the thickened portion 49 of the lower or inner end of the pointer 39. Directly under the main portion 43 of the swinging frame the portion 25 of the frame of the attachment is vertically bored and provided on its under side with a tubular downward extension 50, and sliding freely vertically in this extension is a rod 51 whose lower end rests on the periphery of the wheel 10 and on whose upper end rests the said portion 43 of the swinging frame.

In practical operation, as a hide or skin is passed through the machine for measuring areas, between the roller 7 and the wheels 10, each of said wheels is lifted substantially vertically by the hide or skin, and in said machine its area is measured by mechanism connected with the segment 23. By applying our attachment in the manner shown so that the rod or bolt 51 rests on the periphery of one of said wheels 10, it is evident that as the hide or skin passes through the machine its thickness during the entire line of its passage constantly operates to move up or allow to drop the rod or bolt 51, which is kept pressed against the wheel by gravity and by the weight of the frame 43. Every upward and downward movement of the rod 51 causes the frame 43 to swing up or down, and, by means of the screw 40 the pointer 39 is moved over the dial, and every movement of the pointer 39 is communicated by the shaft 31 to the pointer 40 and produces corresponding movement. By watching either of the dials the extreme movements of the pointers can be seen and noted. Thus if the pointers should vibrate between the numbers 3 and 4 on the dials it would denote that the average thickness of the skin or hide is that which corresponded to $3\frac{1}{2}$ on the dial.

Preferably a small screw 52 is applied to the heel of the pointer 39, said screw acting as a rest or stop when the two pointers are in position at the extreme left as the dials are faced. It will be seen therefore that while the area-measuring machine is doing its work our attachment is measuring the thickness of the leather by registering the vertical movements of one of the wheels 10.

Having thus fully described our invention, what we claim, and desire to secure by Letters Patent, is:—

1. In a thickness-measuring attachment for machines for measuring the areas of surfaces, a horizontal frame adapted and constructed to be rigidly secured to an area-measuring machine above a wheel which bears on the surface to be measured, a rod or bolt set substantially vertically in the frame and adapted to rest with its lower end on the periphery of said wheel, a horizontal shaft supported by the frame, a dial on said frame, a pointer rigid on the shaft and extending over the face of the dial, a frame swinging vertically on said shaft and consisting of the main V-shaped portion 43 resting on the upper end of the rod or bolt and of the ear 45 and extension 46, and a suitable adjusting screw on the pointer by which frame the lifting of said wheel and rod or bolt by the piece of material to be measured in the area-measuring machine will move the pointer over the dial.

2. In a thickness-measuring attachment for machines for measuring the areas of surfaces and provided with wheels which are adapted to rest upon and to be rotated by the sheet of material which is being passed through the machine and measured, a frame, a pair of dials supported at opposite ends of said frame and extending upward and downward respectively, a shaft supported by the frame, a pair of pointers rigid on opposite ends of the shaft and extending over the faces of the two dials, a rod or bolt sliding in the frame and adapted to be engaged and reciprocated by one of said wheels, and
5 mechanism intermediate of the rod or bolt and the shaft for imparting rotation to the latter, for the purpose set forth.

In testimony whereof we have signed our names to this specification in the presence of two subscribing witnesses.

JAMES ROBERTSON.
JOHN S. DELANEY.

Witnesses:
HENRY W. WILLIAMS,
M. A. ATWOOD.